US009676150B2

(12) United States Patent
Whiffen

(10) Patent No.: US 9,676,150 B2
(45) Date of Patent: Jun. 13, 2017

(54) CAPSULE FORMATION

(75) Inventor: Robert Seon Whiffen, London (GB)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 173 days.

(21) Appl. No.: 14/237,818

(22) PCT Filed: Jul. 27, 2012

(86) PCT No.: PCT/EP2012/064783
§ 371 (c)(1),
(2), (4) Date: Feb. 27, 2014

(87) PCT Pub. No.: WO2013/020835
PCT Pub. Date: Feb. 14, 2013

(65) Prior Publication Data
US 2014/0295077 A1    Oct. 2, 2014

(30) Foreign Application Priority Data
Aug. 10, 2011 (GB) .................................. 1113776.7

(51) Int. Cl.
*B29C 71/02* (2006.01)
*B01J 13/04* (2006.01)
*A24B 15/28* (2006.01)
*A24D 3/06* (2006.01)
*A23L 27/00* (2016.01)

(52) U.S. Cl.
CPC .............. *B29C 71/02* (2013.01); *A23L 27/72* (2016.08); *A24B 15/283* (2013.01); *A24D 3/061* (2013.01); *B01J 13/046* (2013.01)

(58) Field of Classification Search
CPC ....... A23L 27/72; A24B 15/283; A24D 3/061; B01J 13/046; B29C 71/02
USPC ........ 428/402–402.24, 403, 404, 407, 321.1, 428/474.4; 427/331, 389.9, 212, 427/213–213.36, 483, 256; 264/534, 5, 264/41, 4–4.7; 424/400, 408, 450, 451, 424/455, 93.7, 184.1, 497, 489, 501, 490, 424/491, 492, 493, 494, 495
See application file for complete search history.

(56) References Cited

U.S. PATENT DOCUMENTS

| | | | |
|---|---|---|---|
| 4,154,379 A | 5/1979 | Schermutzki | |
| 4,251,195 A | 2/1981 | Suzuki et al. | |
| 4,422,985 A | 12/1983 | Morishita et al. | |
| 5,223,185 A * | 6/1993 | Takei | B01J 13/04 264/14 |
| 5,236,466 A | 8/1993 | Lauterbach | |
| 2004/0051192 A1 | 3/2004 | Suzuki et al. | |
| 2006/0144412 A1* | 7/2006 | Mishra | A24B 15/283 131/337 |
| 2008/0277812 A1* | 11/2008 | Guisinger | B01J 13/04 264/4.32 |
| 2009/0035414 A1* | 2/2009 | Cheng | A23L 1/0061 426/5 |
| 2009/0304788 A1 | 12/2009 | Kim et al. | |

FOREIGN PATENT DOCUMENTS

| | | |
|---|---|---|
| EP | 0513563 | 11/1992 |
| EP | 0513603 | 11/1992 |
| EP | 0525731 | 2/1993 |
| EP | 0919279 | 11/1998 |
| EP | 1240883 | 9/2002 |
| EP | 0778083 | 5/2003 |
| EP | 1310229 | 5/2003 |
| EP | 1362583 | 11/2003 |
| EP | 1764151 | 3/2007 |
| GB | 789844 | 1/1955 |
| GB | 1142708 | 11/1965 |
| JP | 57019032 | 2/1982 |
| JP | 59112833 | 6/1984 |
| JP | 62176536 | 8/1987 |
| JP | 01207126 | 8/1989 |
| JP | 07196478 | 8/1995 |
| JP | 09310943 | 12/1997 |
| JP | 2006288215 | 10/2006 |
| JP | 2008011765 | 1/2008 |
| KR | 960009155 | 7/1996 |
| TW | 200827039 | 7/2008 |
| WO | 9630115 | 10/1996 |
| WO | 9813133 | 4/1998 |
| WO | 9903626 | 1/1999 |
| WO | 0213755 | 2/2002 |
| WO | 0243646 | 6/2002 |
| WO | 2004050069 | 6/2004 |
| WO | 2007012478 | 2/2007 |
| WO | 2007064580 | 6/2007 |
| WO | 2007071512 | 6/2007 |
| WO | 2008056344 | 5/2008 |
| WO | 2010058661 | 5/2010 |

OTHER PUBLICATIONS

Das et al. Materials Chemistry and Physics, 2010, 122: 574-581.*
International Searching Authority; Notification of Transmittal of the International Search Report and the Written Opinion of the International Searching Authority; Jun. 5, 2013; NL.

* cited by examiner

*Primary Examiner* — Irina S Zemel
(74) *Attorney, Agent, or Firm* — Cantor Colburn LLP

(57) ABSTRACT

A method of forming a capsule, comprising: encapsulating a body of solid core material with a coating material and converting the core material from a solid to a liquid to form a capsule having a liquid core encapsulated by a solid coating. An apparatus configured to perform the method is also described.

14 Claims, 7 Drawing Sheets

CAPSULE FORMATION

CROSS REFERENCE TO PRIOR APPLICATION

This application is a national stage application filing under 35 U.S.C.§371 of and claims benefit under 35 USC §365(c) to PCT/EP2012/064783, filed on Jul. 27, 2012, which claims priority to and benefit of Great Britain Patent Application No. 1113776.7, filed on Aug. 10, 2011, currently pending.

FIELD

The invention relates to the formation of capsules. Particularly, but not exclusively, the invention relates to an apparatus and method for forming capsules with a core encapsulated by a shell. The capsules may be for use in the tobacco industry.

BACKGROUND

As used herein, the term "smoking article" includes any tobacco industry product and includes smokeable products such as cigarettes, cigars and cigarillos whether based on tobacco, tobacco derivatives, expanded tobacco, reconstituted tobacco or tobacco substitutes and also heat-not-burn products.

Capsules can be incorporated into cigarettes and other smoking articles. For example, one or more breakable flavour capsules can be positioned inside the filter of a cigarette to allow a smoker to make a flavour selection before or during smoking. Generally speaking, the capsules are broken by squeezing the filter between finger and thumb to cause a flavour substance which was previously contained within the capsule to be released into the filter.

Equipment used to manufacture capsules for the tobacco industry includes, for example, a dual nozzle through which core material and shell material are fed simultaneously. The core and shell materials are supplied from separate containers, which are exclusively connected to the dual nozzle via separate feeds. A cooling fluid system, also exclusive to the dual nozzle, is used to cool a core/shell combination which exits the nozzles.

The invention provides an improved process and apparatus for manufacturing capsules.

SUMMARY

According to the invention, there is provided a method of forming a capsule, comprising encapsulating a body of core material in a solid state with a coating material; and converting the core material from a solid state to a liquid state to form a capsule having a liquid core encapsulated by a solid coating.

Encapsulating the core material may comprise coating the core material in a solid state with the coating material in a liquid state.

Encapsulating the core material may comprise forming a solid coating of substantially uniform thickness around the core material.

The method may comprise solidifying the coating material around the core material before converting the core material from a solid state to a liquid state.

Solidifying the coating material around the core material may comprise reacting sodium alginates with calcium ions.

The solid state of the core material may be a frozen state.

Converting the core material from a solid state to a liquid state may comprise melting the core material.

Melting the core material may comprise subjecting the capsule to the earth's natural atmospheric conditions.

The solid coating material may have a higher melting point than the core material.

The method may comprise applying the coating material to the solid core material in a drum-coating process.

Coating the core material may comprises placing the core material inside a rotation unit; rotating the rotation unit with the core material inside; and applying the coating material to the core material during rotation of the rotation unit.

The method may comprise forming the body of core material as a substantially spherical body of core material before encapsulating it in coating material.

Forming the solid body of core material may comprise forming a liquid body of core material; causing the liquid body of core material to follow a spiral path in a fluid configured to cause the liquid body of core material to a change to a solid state; and collecting the solid body of core material from the fluid.

The fluid may be a cooling fluid configured to cool the liquid body of coating material and thereby cause it to change into a solid state.

According to the invention, there is also provided a capsule formed according to the method defined above.

According to the invention, there is also provided a smoking article comprising a capsule formed according to the method defined above.

According to the invention, there is also provided an apparatus configured to form a capsule, comprising: a nozzle for outputting a liquid body of core material; and a core material director configured to cause the liquid body of core material to follow a spiral path in a fluid configured to cause the liquid body of core material to change to a solid state.

The apparatus may comprise a collector configured to collect the solid body of core material from the fluid.

The apparatus may comprise a coater configured to encapsulate the solid body of core material with a coating.

The coater may comprise a rotation unit configured to receive the solid body of core material and to rotate with the solid body of core material inside, and the apparatus may be configured to coat the solid body of core material during rotation of the rotation unit.

The rotation unit may comprise a rotatable drum.

The fluid may be a cooling fluid configured to cool the liquid body of core material and thereby cause it to change to a solid state.

For the purposes of example only, embodiments of the invention are described below with reference to the accompanying figures in which:

DETAILED DESCRIPTION

A process for forming a capsule 1 which is suitable for incorporating into a cigarette or other smoking article is described below.

Figure 1:
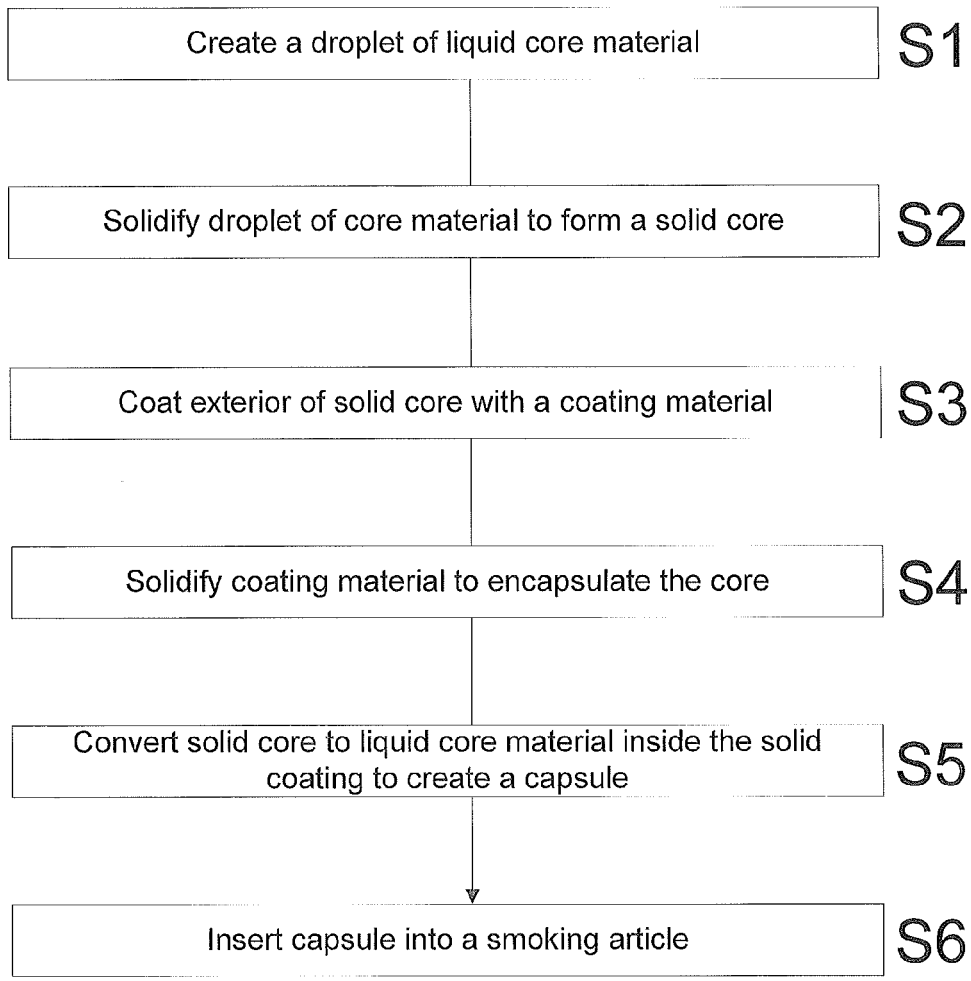
FIG. 1 is a flow diagram of an example of a method for forming capsules having a solid shell and a liquid core.
Figure 2:
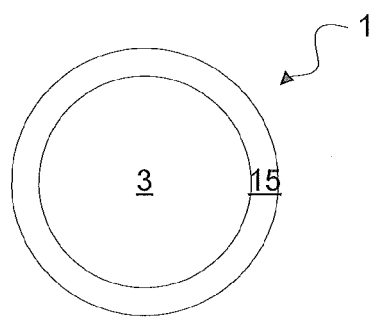
FIG. 2 is a schematic illustration of a substantially spherical capsule comprising a core surrounded by a shell.

In a first step S1, shown in FIG. 1, a core material 2 is used to form a core 3 of the capsule 1. The following description generally refers to a core 3 which is substantially spherical and an example of such a core 3 is illustrated in FIG. 2. However, as will be explained below, other shapes of core 3 can also be produced. In terms of size, the core 3 will generally have a diameter in the range of between approximately 0.5 mm and approximately 5 mm. A typical diameter of the core 3 is 3.3 mm. It should be understood, however, that the process is not limited to forming capsules 1 with cores 3 having diameters in this size range. Cores 3 with diameters bigger or smaller than those given above can also be formed using the process. As will be explained below, the core material 2 may be volatile and may be formulated to include a flavour compound such as menthol. One skilled in the art will appreciate that a variety of different flavours could be formulated to be included in a suitable core material 2. The flavour contained in the capsules 1 is released at a required time, for example when a shell of the capsule 1 is perforated or crushed.

Figure 3:
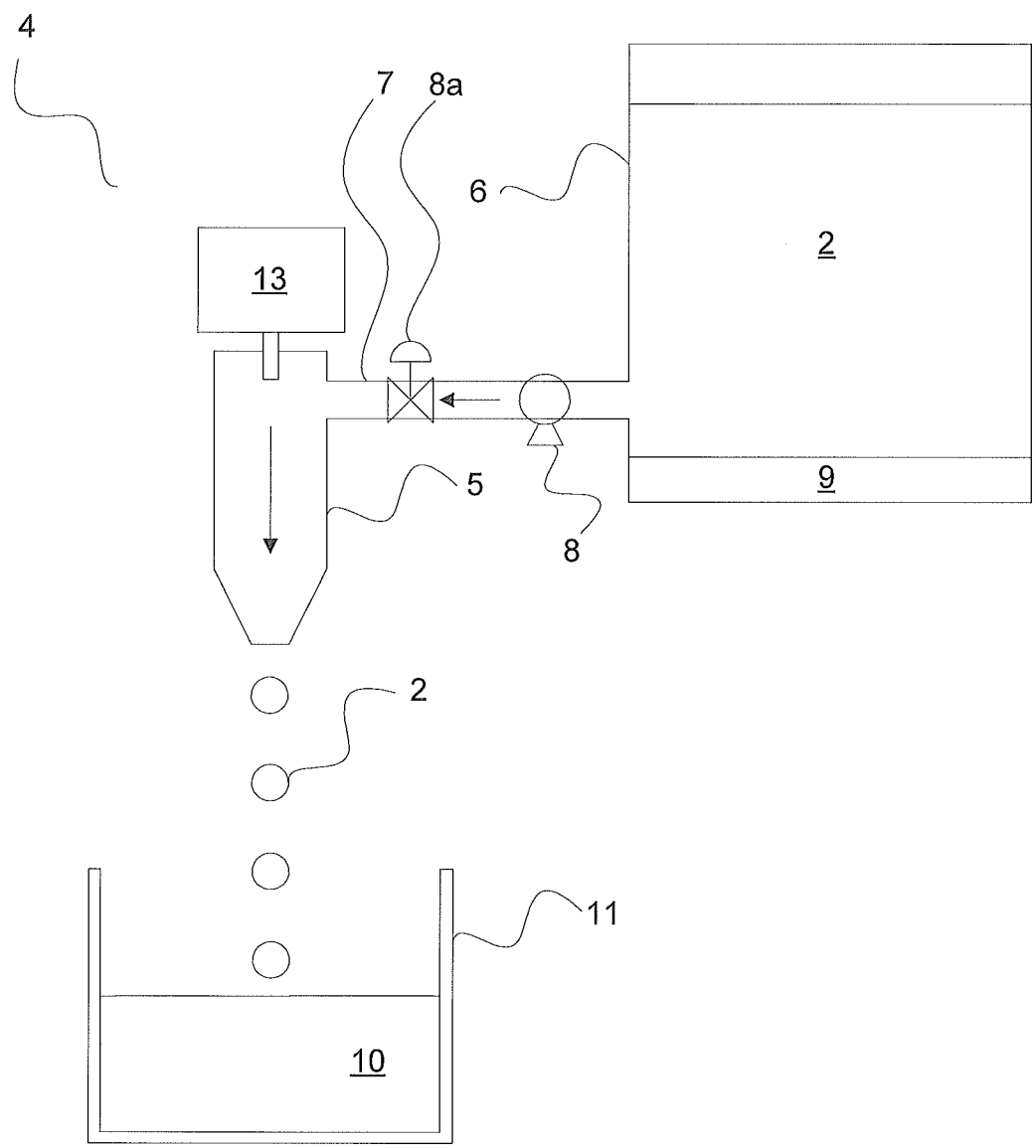
FIG. 3 is a schematic illustration of a nozzle apparatus for forming capsule cores.

Referring to FIG. 3, the cores 3 can be formed using a nozzle apparatus 4. The nozzle apparatus 4 comprises a nozzle 5 which is configured to receive core material 2 from a core material source 6. Hereinafter the core material source 6 will be described in terms of a tank 6 in which core material 2 is stored, although it will be appreciated that other types of source 6 are also possible such as, for example, portable containment vessels such as IBC containers. The core material tank 6 can be connected to the nozzle 5 by a pipe 7, or another suitable type of supply line, which allows the core material 2 to flow from the tank 6 to the nozzle 5. A pump 8 may be included in the nozzle apparatus 4 to pump the core material 2 from the tank 6 along the pipe 7 to the nozzle 5. A control valve 8a may be present in the pipe 7 to control the flow rate of core material 2 to the nozzle 5. For example, the control valve 8a may be incorporated into the pipe 7. As can be seen from FIG. 3, the control valve 8a may be located downstream from the pump 8. The core material 2 is generally stored in the tank 6 in a liquid state so that it can flow directly from the tank 6, through the pipe 7 and subsequently into the nozzle 5. However, optionally, the core material 2 may be stored in the tank 6 in a solid state. In this case, core material 2 from the tank 6 is converted into a liquid state before it flows through the pipe 7 to the nozzle 5. A heater 9 of any suitable type may be included in the apparatus 4 to heat and melt the core material 2 so that it can flow along the pipe 7. Additional thermal insulation, for example in the form of pipe lagging, may be used to insulate the pipe 7. The thermal insulation is configured to prevent the core material 2 from falling in temperature and becoming solidified before discharge from the nozzle 5. During operation, a stream of core material 2 may flow substantially continuously along the pipe 7 into the nozzle 5. The flow of core material 2 is shown by arrows in FIG. 3.

Core material 2 entering the nozzle 5 from the tank 6 passes through the nozzle 5 and exits as a series of droplets. For example, the exit of the nozzle 5 may be located below the entrance of the nozzle 5 so that core material 2 moves from the entrance to the exit of the nozzle 5 under gravity. The flow of material 2 through the nozzle 5 may optionally be aided by the action of a pump such as the pump 8 referred to above. The pump 8 is configured to provide extra motive force to aid with discharge of the core material 2 from the nozzle 5. The pump 8 may, therefore, be of particular help for discharging core materials 2 which have a relatively high viscosity. The extra motive force provided by the pump 8 may be regulated by opening and/or closing a control valve 8a positioned in the pipe 7. The control valve 8a can be selectively opened or closed to increase or decrease the flow rate of core material 2 into/out of the nozzle 5. The control valve 8a may be of particular help for core materials 2 which have a lower viscosity and for which the flow rate provided by the pump 8 is undesirably high.

In a second stage S2 of the process, the droplets of core material 2 are solidified. For example, droplets of core material 2 which have exited the nozzle 5 can enter a fluid 10 in which the core material 2 is caused to solidify. The fluid 10 may be a cooling fluid configured to solidify the droplets by reducing their temperature, and will be described below in such context. However, it will be appreciated that alternative, for example chemical, solidification process can take place to solidify the core material 2 and therefore that the fluid 10 does not need to be a cooling fluid 10.

Figure 4:
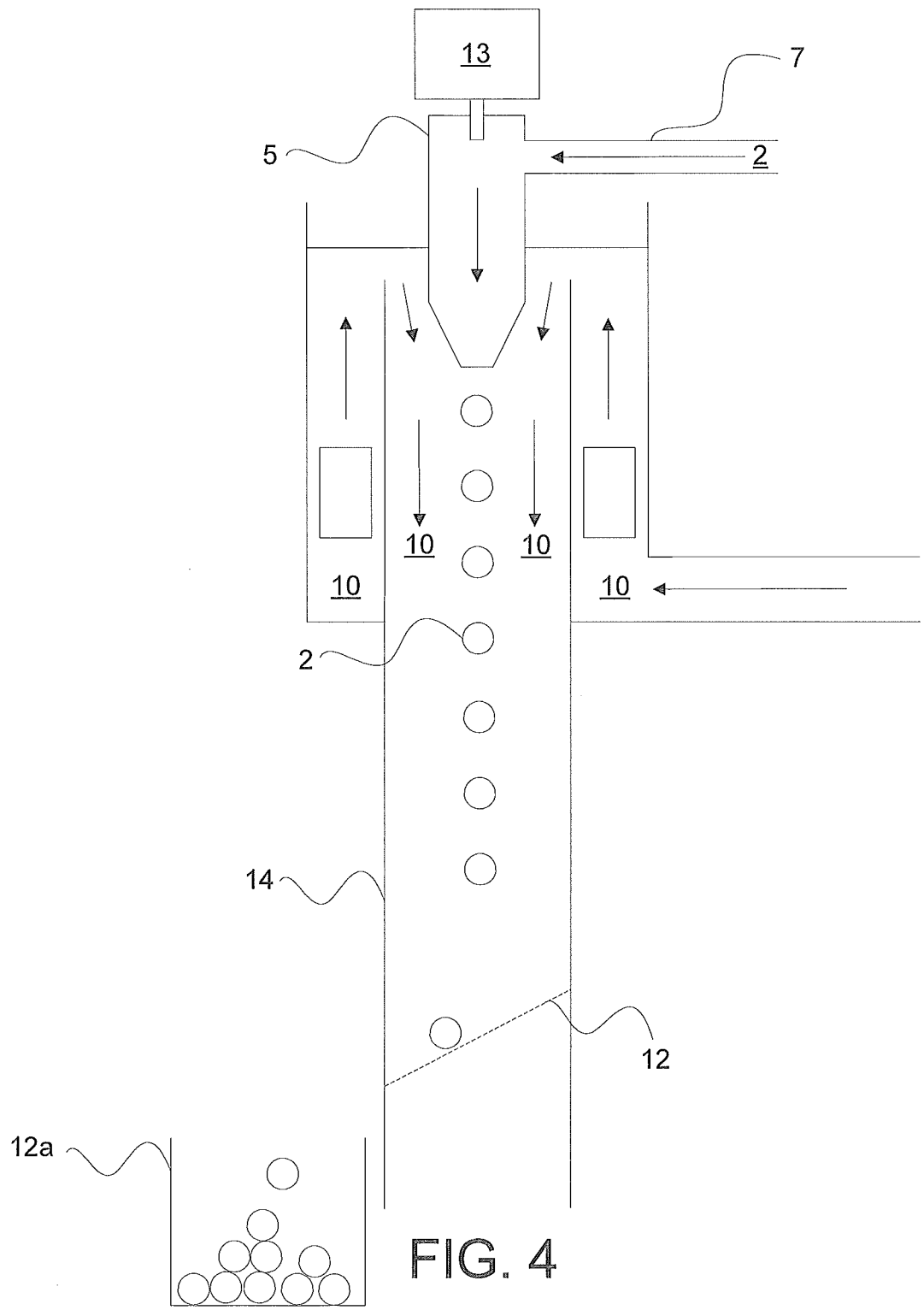
FIG. 4 is a schematic illustration of a nozzle apparatus and a cooling fluid flow system for forming capsule cores. The nozzle is immersed in the cooling fluid, which is driven longitudinally past the nozzle.

The fluid 10 is preferably immiscible or substantially immiscible with the core material 2. It may comprise a suitable food-grade oil. Alternatives to oils include propylene glycol, glycerol, or other suitable food-grade material which, if used as a cooling fluid 10, remains in the liquid phase at temperatures below the freezing point of the core material 2. The fluid 10 solidifies the liquid droplets 2, for example by cooling and freezing them, thereby forming the solid cores 3 referred to above. For example, as shown in FIG. 3, the droplets 2 can fall under gravity through a gas such as air into a fluid reservoir 11 located below the exit of the nozzle 5. Alternatively, as shown in FIG. 4, the exit of the nozzle 5 may be immersed in the fluid 10 so that droplets 2 enter the fluid 10 directly from the nozzle 5.

Figure 5:
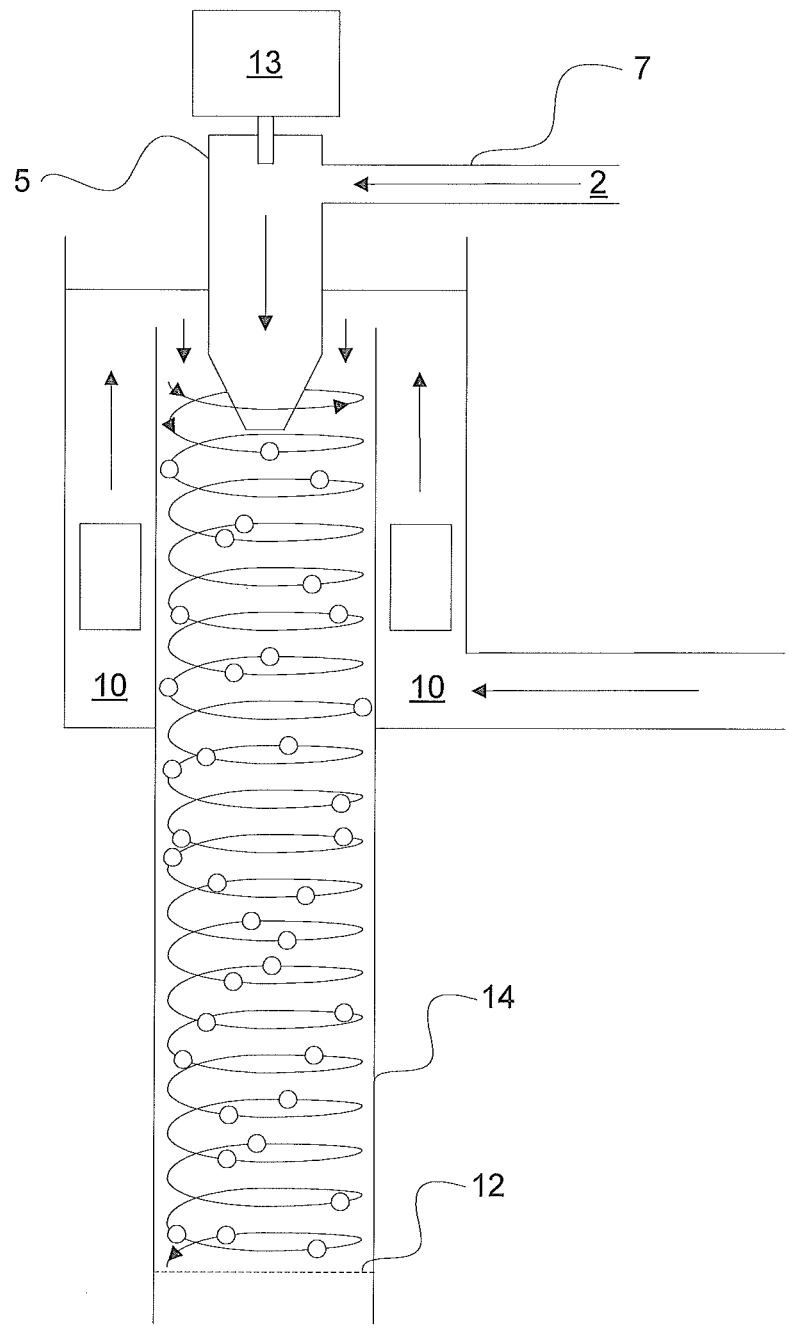
FIG. 5 is a schematic illustration of a nozzle immersed in a cooling fluid which is being driven in a spiral flow pattern between the nozzle and a capsule core collection point.

A flow pattern may be established in the fluid 10. For example, a re-circulating flow of fluid 10 may be established so that fluid 10 flows around a looped system which starts and finishes at the exit of the nozzle 5. Other types of flow pattern are also possible, as discussed further below. Baffles may be used to aid with directing the fluid 10 around the loop. Additionally or alternatively, the flow of fluid 10 may be at least partially directed by the use of one or more core material directors such as angled nozzle jets, pumps and/or paddles which are configured to eject or direct streams of the fluid 10 into the larger flow, or main body, of fluid 10 at a higher velocity than the larger flow, or main body, of fluid 10. The flow of fluid 10 carries the droplets 2 away from the exit of the nozzle 5 to a collection point. If a flow pattern is used, one or more flow restrictors may be placed in the path of the fluid 10 in order to regulate its flow. This is shown in FIGS. 4 and 5.

If a flow pattern is used, the flow of fluid 10 carries the cores 3 to a collector 12, for example a suitably sized mesh or grating immersed in the stream of fluid 10, which collects the solidified cores 3 whilst allowing the fluid 10 to pass through it. The collector 12 may be angled to allow for the cores 3 to roll down a slope into a receptacle 12a, whilst separating the fluid 10 and allowing it to re-circulate. As previously described, the fluid 10 may subsequently be driven around a looped system back to the nozzle 5, from which it carries more droplets 2/cores 3 to the collector 12 in the manner already described. This is discussed in more detail below in the discussion of fluid flow patterns, particularly in relation to FIG. 6. The looped system can optionally incorporate a refrigeration unit which is configured to cool the fluid 10 as it re-circulates back to the nozzle 5.

As referred to previously, the droplets of core material 2 exiting the nozzle 5 take on a substantially spherical shape in the fluid 10. Therefore, as the droplets solidify, they form substantially spherical cores 3. The creation of the droplets 2 at the nozzle 5 can be aided by applying a vibration to a suitable point of the nozzle apparatus 4. For example, a vibrator 13 can be used to vibrate the nozzle 5 as core material 2 moves through it and out of the nozzle exit. Additionally, or alternatively, the vibrator 13 can be used to vibrate the pipe 7 through which the core material 2 flows to the nozzle 5. The vibration caused by the vibrator 13 breaks up the continuous stream of core material 2 and therefore aids with formation of the droplets 2 at the nozzle exit. The frequency at which the vibrator 13 vibrates is adjustable in response to user controls so that the application of the vibration can be optimized for the particular core material 2 being used and the desired core size.

As referred to above, a flow pattern can be established in the fluid 10. In its simplest form, the flow pattern may comprise a longitudinal and substantially uniform stream of fluid 10 which flows past the exit point of the nozzle 5 at a substantially uniform velocity and carries the droplets 2 of core material to the collector 12 along a relatively short and direct longitudinal path. An example is shown in FIG. 4.

Figure 6:
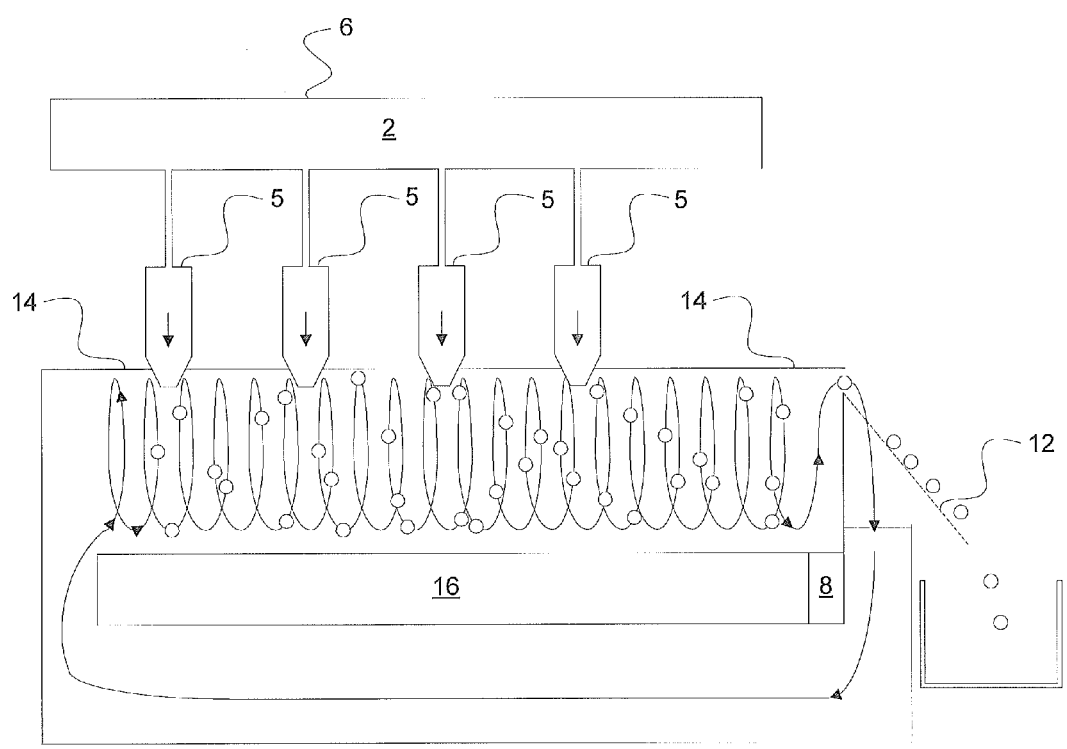
FIG. 6 is a schematic illustration of a plurality of nozzles immersed in a stream of cooling fluid which flows past all of the nozzles and re-circulates.

A more sophisticated flow pattern comprises a spiral flow of fluid 10, which carries the droplets 2 of core material to the collector 12 along a relatively long and indirect path. An example is shown in FIGS. 5 and 6. The fluid 10 is driven in a spiral pattern, at least in a region between the nozzle exit and the collector 12, by one or more jets, paddles and/or pumps so as to cause the droplets 2 to follow along a spiral path on their way to the collector 12. The pipe or shaft 14 along which the droplets 2 are driven may be shaped so as to aid with the creation and maintenance of the spiral flow pattern of the fluid 10. By driving the droplets 2 in a spiral pattern towards the collector 12 rather than the direct path described above and illustrated in FIG. 4, the droplets 2 spend more time and travel a further distance in the fluid 10 for a given longitudinal distance of the pipe 14. Therefore, compared to the direct, longitudinal path referred to above, an equivalent cooling/hardening time and distance of travel for the droplets 2 in the fluid 10 is obtained for a much shorter longitudinal distance between the nozzle exit and the collector 12. The number of droplets 2 present per unit volume of fluid 10 is also increased. As such, the size and, in particular, the footprint of an apparatus 4 using a spiral cooling fluid flow pattern can be much smaller than an apparatus 4 using a more direct flow path between the nozzle exit and collector 12. A high rate of capsule production can be attained with a small overall size of apparatus 4.

Referring to FIG. 6, optionally, the apparatus 4 may include a plurality of the nozzles 5 all immersed in the same stream of re-circulating fluid 10. Thus, only a single fluid system is required. The fluid system is common to all nozzles 5. Furthermore, the core fluid 2 may be supplied to all of the nozzles 5 from the same source tank 6 located directly above the nozzles 5. It can be appreciated that it is also possible to supply each nozzle with a different core fluid with separate tanks. By providing a common fluid system and/or common source tank, the overall size, in particular the footprint, of the apparatus 4 is reduced compared to apparatuses which do not use such common fluid and/or supply systems.

The fluid 10 may be driven in any of the flow patterns referred to above and re-circulates in a looped cycle to continuously carry droplets 2 of core material to a collector 12, solidifying them on the way. A cooling unit 16 may be positioned within the loop so as to cool the fluid 2 as required during circulation. In FIG. 6, the fluid 10 is driven in a spiral pattern between the nozzle exits and the collector 12, thereby allowing the droplets 2 to be solidified, for example by being cooled and frozen, into solid cores 3 over a relatively short longitudinal distance between the nozzles 5 and the collector 12. Vibrator(s) 13 are not shown in FIG. 6 but may nevertheless be used in the manner previously described.

It will be appreciated that other techniques and apparatuses can be used to manufacture the cores 3 as an alternative to those described above. For example, the cores 3 could be formed using a moulding apparatus to shape the core material 2. The moulding apparatus may comprise a plurality of spherical, or other suitably-shaped, moulds in which the core material 2 can be moulded to produce a plurality of capsule cores 3. Optionally, the plurality of moulds can be of different shapes so that various different shapes of cores 3 can be produced simultaneously. In order for easy maintenance and to increase the range of core shapes that can be manufactured, the apparatus can be configured so that the moulds are easily removable and replaceable with new or differently shaped moulds.

Optionally, the core material 2 can be placed, for example injected, into the moulding apparatus in a liquid state before being solidified, for example cooled, to create the solid cores 3. In order to facilitate this, the moulding apparatus 4 may comprise temperature control equipment adapted to cool and freeze the core material 2 inside the moulds so as to form solidified cores 3.

Once the core material 2 is solidified inside the moulds, spherical or otherwise-shaped cores 3 are removed and used to form capsules 1.

In a third step S3 of the process, the cores 3 are coated in a coating 15 whilst in a solid, for example frozen, state. Various different coating techniques can be used. For example, referring to FIG. 7, a rotation unit 17 having a rotation chamber configured to rotate with the cores 3 inside it during coating of the cores 3 can be used. An example is a drum coating apparatus 17. The drum apparatus 17 comprises a rotatable drum 18, for example a coating pan, into which solid cores 3 are placed and in which the coating 15 is applied to the cores 3. The drum 18 may be substantially spherical or cylindrical in shape and has an opening 19 for inserting and removing the cores 3, the coating material 15 and other items or fluids. The internal surface of the drum 18 may be highly polished to help prevent unwanted build up of coating material 15 or damage to the spherical form of the cores 3. The drum 18 is configured to rotate with the cores 3 inside it, thereby causing the cores 3 to themselves rotate and move inside the drum 18. Cores 3 in the lowest region of the drum 18 may, for example, be lifted inside the drum

Figure 8:
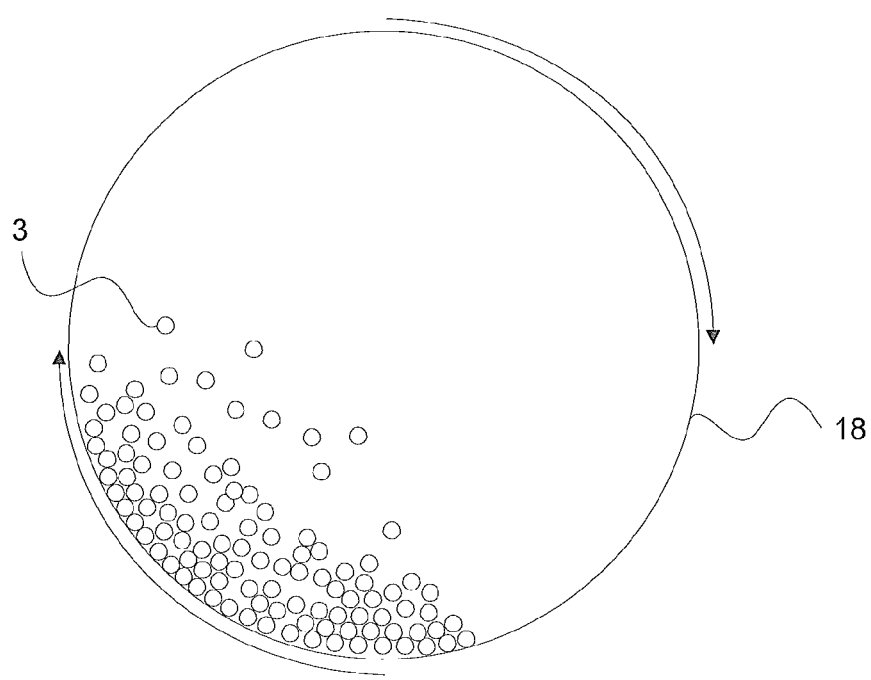
FIG. 8 is a schematic illustration of a rotating drum containing solid capsule cores within a drum coating apparatus.

18 by its rotary action, before falling back to the lowest region of the drum 18 under gravity. This is illustrated in FIG. 8.

The temperature inside the drum 18 is sufficiently low to prevent the cores 3 from melting. If the cores 3 are of a formulation based upon menthol, a suitable temperature may be between minus ten and five degrees Celsius. However, any temperature can be used which maintains the core material 2 in a solid state. If required, the coating apparatus 17 may comprise a temperature control unit 20 for maintaining the temperature inside the drum 18 at a desired level, either by cooling or heating.

Figure 7:
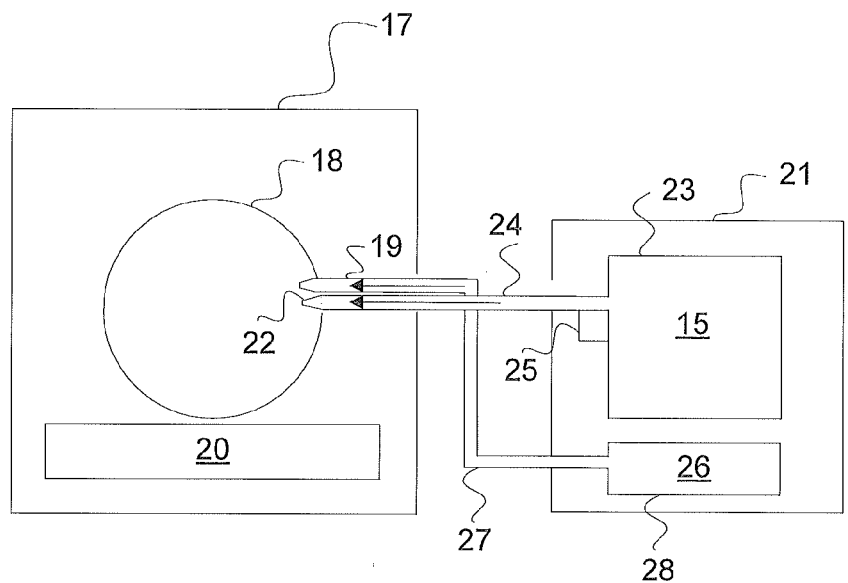
FIG. 7 is a schematic illustration of an apparatus for drum-coating solid capsule cores.

A coating material supply unit 21 is configured to supply a coating material 15 into the drum 18 to coat the cores 3. A suitable coating material 15 is a gelatine solution which gels to form a solid and frangible material. The coating material 15 is able to irreversibly change state from a liquid solution to a solid, driven either by a change in temperature or by addition of a compound which causes it to solidify. It can be appreciated that there are a variety of different gelling or encapsulating substances which could be used as the coating material 15 which, when treated, form a solid, frangible shell; for example, gelatin, sodium alginate and guar gum. The coating material 15 may, for example, be supplied into the drum 18 through the opening 19 referred to above. This is shown in FIG. 7. The supply unit 21 can supply the coating material 15 into the drum 18 in any suitable way. For example, the unit 21 may be configured to spray the material 15 into the drum 18 from a nozzle 22 attached to the supply unit 21. The nozzle 22 may be connected to a tank 23 of coating material 15 inside the supply unit 21 by a pipe 24 or other suitable means and a pump 25 may be used to pump the coating material 15 from the tank 23 to the nozzle 22. The tank 23 may incorporate or otherwise be subjected to temperature control equipment within the supply unit 21 so that the coating material 15 stored inside the tank 23 is maintained and supplied to the nozzle 22 at a desired application temperature.

Another option is to pour the coating material 15 into the drum 18 using a pouring spout or another suitable device.

The coating material 15 is generally supplied into the drum 18 whilst the drum 18 is rotating and whilst the cores 3 are inside. The coating material 15 can be in a liquid state when supplied into the drum 18 by the supply unit 21, thereby allowing it to form an even and uniform coating on the cores 3 as the cores 3 are rotated inside the drum 18. The coating 15 subsequently solidifies, for example due to a relatively low temperature inside the drum 18 or because of contact with the cores 3, to form a solid coating which wholly encapsulates the solid cores 3. The coated cores may vary in terms of the thickness of their coating material, depending upon the residence time of the cores in the drum 18. Cores which are tumbled for a longer period of time will have a thicker coating 15. When solidified, this will produce a thicker shell wall around the core 3. Therefore, the thickness of the coating/shell 15 can be adjusted as required by increasing or reducing the amount of time for which the cores 3 reside inside the drum 18 with the coating material 15. The thickness of the coating 15 may impact the characteristics of the capsule 1. For example, the thickness of the coating 15 may affect how frangible the capsule 1 is. The cores 3 may enter the drum 18 via an opening in the rear of the drum 18 and exit via a similar opening in the front of the drum 18. For example, the cores 3 may be driven over a lip at the edge of the drum into a containment vessel.

Figure 9:
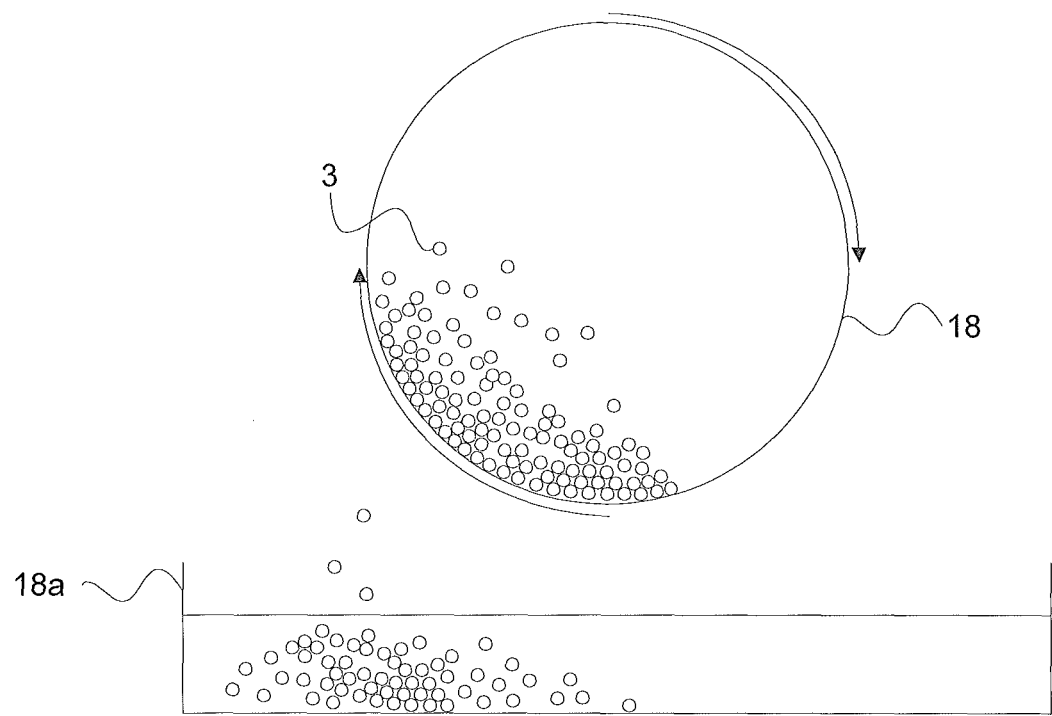
FIG. 9 is a schematic illustration of rotating drum containing solid capsule cores within a drum coating apparatus and a reservoir of gelling fluid into which coated capsule cores can be discharged.

In an alternative embodiment, the cores 3 could be thinly and quickly coated with the coating 15 and then discharged from the drum 18, for example as described above, into a reservoir 18a of another solution, for example a gelling solution, which reacts with the coating 15 of the capsule 1 to form a solid shell 15 around the core 3. This is illustrated in FIG. 9.

In a further embodiment, the cores 3 could be formulated to include a compound which will cause the coating 15 to solidify once in contact with the cores 3. For example, the reaction of calcium ions with sodium alginates may be used. The calcium ions and sodium alginates may be contained in opposite ones of the cores 3 and coating material 15 so that the reaction occurs upon contact. Alternatively, the calcium ions (or sodium alginates) may be contained in the coating material 15 whilst the sodium alginates (or calcium ions) is contained in the gelling solution in the reservoir 18a. This causes the coating 15 to solidify when the coated cores 3 are discharged into the reservoir 18a referred to above.

The solid shell 15 should preferably be formed quickly from the coating 15 in order to reduce the likelihood of the core material 2 escaping the encapsulation process, and thus resulting in empty shells or solid capsules of coating material 15. The encapsulation of the cores 3 broadly constitutes the fourth stage S4 of the capsule formation process. The results are the capsules 1 referred to above and illustrated in FIG. 2. The coating 15 may be between 0.01 mm and 5 mm thick. An example thickness is 0.1 mm.

The melting point of the coating material 15 may be higher than the melting point of the core material 2. Therefore, if the coating material 15 is liquid when entering the drum 18, it is preferable that the cores 3 are not melted by the heat in the coating material 15 when it is initially introduced into the drum 18. Optionally, a cooling gas 26 is supplied into the drum 18 substantially simultaneously with the coating material 15 to cause the coating material 15 to solidify around the cores 3 and to prevent the cores 3 from being melted by the coating material 15 before the coating material 15 has solidified. The cooling gas 26 may be supplied into the drum 18 through the opening 19 by the coating supply unit 21 or by some other suitable means. A pipe 27 may be used to output the cooling gas 26 into the drum 18 from a suitable supply source 28 such as a tank. The temperature of the cooling gas 26 is selected in dependence of both of the materials 2, 15 being used to form the capsules 1 and of the desired speed at which the coating material 15 is to be solidified inside the drum 18.

Other types of coating processes can alternatively be used to coat the cores 3. For example, the solid cores 3 can be dipped in a reservoir of liquid coating material 15 which is then solidified on the outside of the cores 3. A cooling gas similar to that already described can be used to aid the solidification of the coating 15. The cores 3 could also be roll-coated in the coating material 15 using known processes used in the food and pharmaceutical industries.

As described above, before and during the coating process the cores 3 are generally kept in environmental conditions, for example within a particular temperature range, in which the core material 2 is in a solid state. This retains the shape of the cores 3 during the coating process and ensures that the coating layer 15 which surrounds the cores 3 takes on the same shape as the cores 3 themselves. For example, as shown in FIG. 2, if the cores 3 are spherical during the coating process the coating 15 forms a spherical skin around the outside of each core 3.

However, once the coating process has been completed and a solid coating layer 15 is present around the cores 3, the core material 2 is confined within the coating 15 and the shape of the body of core material 2 is defined by the shape of the solid coating 15 around the outside of the core 3. The solid structure of the coating 15 has different physical and chemical properties compared to the liquid precursor from which it was formed. For example, once solidified around the cores 3, the solid coating 15 may be thermally stable in a temperature range of between −15 and 60 degrees Celcius. The coating 15, once solidified into the shell of the capsule 1, will also provide an impermeable barrier to the core material 2 inside the capsule 1. This prevents the core material 2 from leaking from the capsule 1, even when it reverts to a liquid state as described below.

In a fifth stage S5 of the capsule formation process, the coated cores 3 can be removed from the coating apparatus, for example from inside the drum 18, or alternatively, the reservoir 18a of shell hardening liquid, and placed in an environment which causes the core material 2 to convert from a solid state to a liquid state. For example, the capsules 1 may be placed in a temperature controlled environment at a temperature which causes the core material 2 to melt and become liquid. If the core material 2 comprises menthol, the transition of the core material 2 from a solid state to a liquid state can be triggered by allowing the capsules 1 to rise to a normal room temperature. With this in mind, the composition of the coating 15 should be chosen so that the coating 15 is solid at the temperatures which generally occur in the environments in which the capsules 1 will be used, and is impermeable to the liquid form of core material 2.

The results are capsules 1 which comprise a liquid, for example menthol, core 3 encapsulated by a solid, for example gelatinous, coating 15. The thickness and structure of the coating 15 is such that when the capsules 1 are squeezed between finger and thumb with a relatively modest amount of pressure, the shell coating 15 cracks or otherwise breaks so that the liquid core material 2 contained within the coating 15 is released. If, in a sixth stage S6, the capsule 1 is inserted into a cellulose acetate filter of a cigarette, breaking the capsule causes liquid core material 2 to bleed into the fibrous filter material and thus add flavour to smoke as it is drawn through the filter from the tobacco rod.

The embodiments and alternatives described above can be used either singly or in combination to achieve the effects of the invention.

The invention claimed is:

1. A method of forming a smoking article containing a capsule having a liquid core, comprising:
(a) making the capsule by:
(i) encapsulating a body of core material in a solid state with a coating material; and
(ii) converting the core material from a solid state to a liquid state to form a capsule having a liquid core encapsulated by a solid coating; and
(b) inserting the capsule into a smoking article.

2. A method according to claim 1, wherein encapsulating the core material comprises coating the core material in a solid state with the coating material in a liquid state.

3. A method according to claim 1, wherein encapsulating the core material comprises forming a solid coating of uniform thickness around the core material.

4. A method according to claim 1, comprising solidifying the coating material around the core material before converting the core material from a solid state to a liquid state.

5. A method according to claim 4, wherein solidifying the coating material around the core material comprises reacting sodium alginates with calcium ions.

6. A method according to claim 1, wherein the solid state of the core material is a frozen state.

7. A method according to claim 1, wherein converting the core material from a solid state to a liquid state comprises melting the core material.

8. A method according to claim 1, wherein the solid coating material has a higher melting point than the core material.

9. A method according to claim 1 comprising applying the coating material to the solid core material in a drum-coating process.

10. A method according to claim 9, wherein coating the core material comprises:
placing the core material inside a rotation unit;
rotating the rotation unit with the core material inside; and
applying the coating material to the core material during rotation of the rotation unit.

11. A method according to claim 1, comprising forming the body of core material as a spherical body of core material before encapsulating it in coating material.

12. A method according to claim 11, wherein forming the solid body of core material comprises:
forming a liquid body of core material;
causing the liquid body of core material to follow a spiral path in a fluid configured to cause the liquid body of core material to a change to a solid state; and
collecting the solid body of core material from the fluid.

13. A method according to claim 12, wherein the fluid is a cooling fluid configured to cool the liquid body of coating material and thereby cause it to change into a solid state.

14. A method of forming a capsule for insertion into a cigarette, comprising:
encapsulating a body of core material in a solid state with a coating material by coating the core material in a solid state with the coating material in a liquid state and forming a solid coating of substantially uniform thickness around the core material;
applying the coating material to the solid core material in a drum-coating process by:
placing the core material inside a rotation unit;
rotating the rotation unit with the core material inside; and
applying the coating material to the core material during rotation of the rotation unit;
converting the core material from a solid state to a liquid state to form a capsule having a liquid core encapsulated by a solid coating;
wherein the solid coating material has a higher melting point than the core material; further
wherein forming of the core material includes forming the body of core material as a substantially spherical body of core material before encapsulating it in coating material, the solid body of core material including:
forming a liquid body of core material;
causing the liquid body of core material to follow a spiral path in a fluid configured to cause the liquid body of core material to change to a solid state; and
collecting the solid body of core material from the fluid, the fluid being a cooling fluid configured to cool the liquid body of core material and thereby cause it to change into a solid state.

* * * * *